United States Patent
Chen et al.

(10) Patent No.: US 11,297,676 B2
(45) Date of Patent: Apr. 5, 2022

(54) BEAM RECOVERY IN CONNECTED DISCONTINUOUS RECEPTION

(71) Applicant: ZTE Corporation, Guangdong (CN)

(72) Inventors: Yijian Chen, Guangdong (CN); Zhaohua Lu, Guangdong (CN); Bo Gao, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 104 days.

(21) Appl. No.: 16/805,734

(22) Filed: Feb. 29, 2020

(65) Prior Publication Data

US 2020/0205219 A1 Jun. 25, 2020

Related U.S. Application Data

(63) Continuation of application No. PCT/CN2017/099974, filed on Aug. 31, 2017.

(51) Int. Cl.
*H04W 76/28* (2018.01)
*H04W 76/19* (2018.01)
(Continued)

(52) U.S. Cl.
CPC .......... *H04W 76/28* (2018.02); *H04B 7/0695* (2013.01); *H04W 24/08* (2013.01); *H04W 76/19* (2018.02)

(58) Field of Classification Search
CPC ..... H04W 76/28; H04W 76/19; H04W 24/08; H04W 76/36; H04W 52/146;
(Continued)

(56) References Cited

U.S. PATENT DOCUMENTS

2015/0312961 A1* 10/2015 Sun ................. H04W 76/36
370/330
2018/0255607 A1* 9/2018 Nagaraja ............... H04L 5/0048
(Continued)

FOREIGN PATENT DOCUMENTS

| CN | 107005859 A | 8/2017 | |
| WO | 2016/085266 A1 | 6/2016 | |
| WO | WO-2018171476 A1 * | 9/2018 | ............... H04L 5/00 |

OTHER PUBLICATIONS

Huawei, "Consideration on DRX with beam management," 3GPP TSG-RAN WG2#99, Berlin, Germany, R2-1708696, 4 pages, Aug. 2017 (Year: 2017).*

(Continued)

*Primary Examiner* — Ayaz R Sheikh
*Assistant Examiner* — Louis Samara
(74) *Attorney, Agent, or Firm* — Perkins Coie LLP

(57) ABSTRACT

This disclosure relates to methods, systems, and devices for improved beam recovery at mobile stations (UE's) that support connected discontinuous reception (C-DRX). In one exemplary aspect, a method for wireless communication is disclosed. The method includes monitoring, at a communication node configured to operate in a connected discontinuous reception mode, a first plurality of reference signals in a time window that overlaps at least partially with a semi-active time or an active time within a discontinuous reception cycle of the communication node.

20 Claims, 13 Drawing Sheets

(51) Int. Cl.
*H04B 7/06* (2006.01)
*H04W 24/08* (2009.01)

(58) Field of Classification Search
CPC ............ H04W 52/0209; H04B 7/0695; H04L 5/0048; H04L 5/0053
See application file for complete search history.

(56) References Cited

U.S. PATENT DOCUMENTS

| | | | |
|---|---|---|---|
| 2019/0053313 A1* | 2/2019 | Zhou | H04W 52/146 |
| 2019/0261287 A1* | 8/2019 | Deenoo | H04W 24/08 |
| 2020/0245395 A1* | 7/2020 | Zhang | H04L 5/0053 |
| 2021/0212153 A1* | 7/2021 | Siomina | H04W 76/28 |
| 2021/0243724 A1* | 8/2021 | Starsinic | H04W 52/0209 |

OTHER PUBLICATIONS

ZTE, "Discussion on beam recovery mechanism," 3GPP TSG RAN WG1 Meeting #88bis, Spokane, Washington, USA, R1-1704400, 6 pages, Apr. 2017 (Year: 2017).*

International Search Report and Written Opinion dated May 25, 2018 for International Application No. PCT/CN2017/099974, filed on Aug. 31, 2017 (8 pages).

Huawei, "Consideration on DRX with beam management," 3GPP TSG-RAN WG2#99, Berlin, Germany, R2-1708696, 4 pages, Aug. 2017.

LG Electronics, "On CSI-RS design for CSI acquisition," 3GPP TSG RAN WG1 NR Ad-Hoc#2, Qingdao, P.R. China, R1-1710293, 9 pages, Jun. 2017.

Nokia, "High speed mobility in NR," 3GPP TSG-RAN WG1#86bis, Lisbon, Portugal, R1-1610295, 9 pages, Oct. 2016.

Research in Motion UK Limited, "Variable DRX based operation for TDM solutions," 3GPP TSG-RAN WG2 Meeting #73b, Shanghai, China, R2-112174, 7 pages, Apr. 2011.

ZTE, "Discussion on beam recovery mechanism," 3GPP TSG RAN WG1 Meeting #88bis, Spokane, Washington, USA, R1-1704400, 6 pages, Apr. 2017.

* cited by examiner

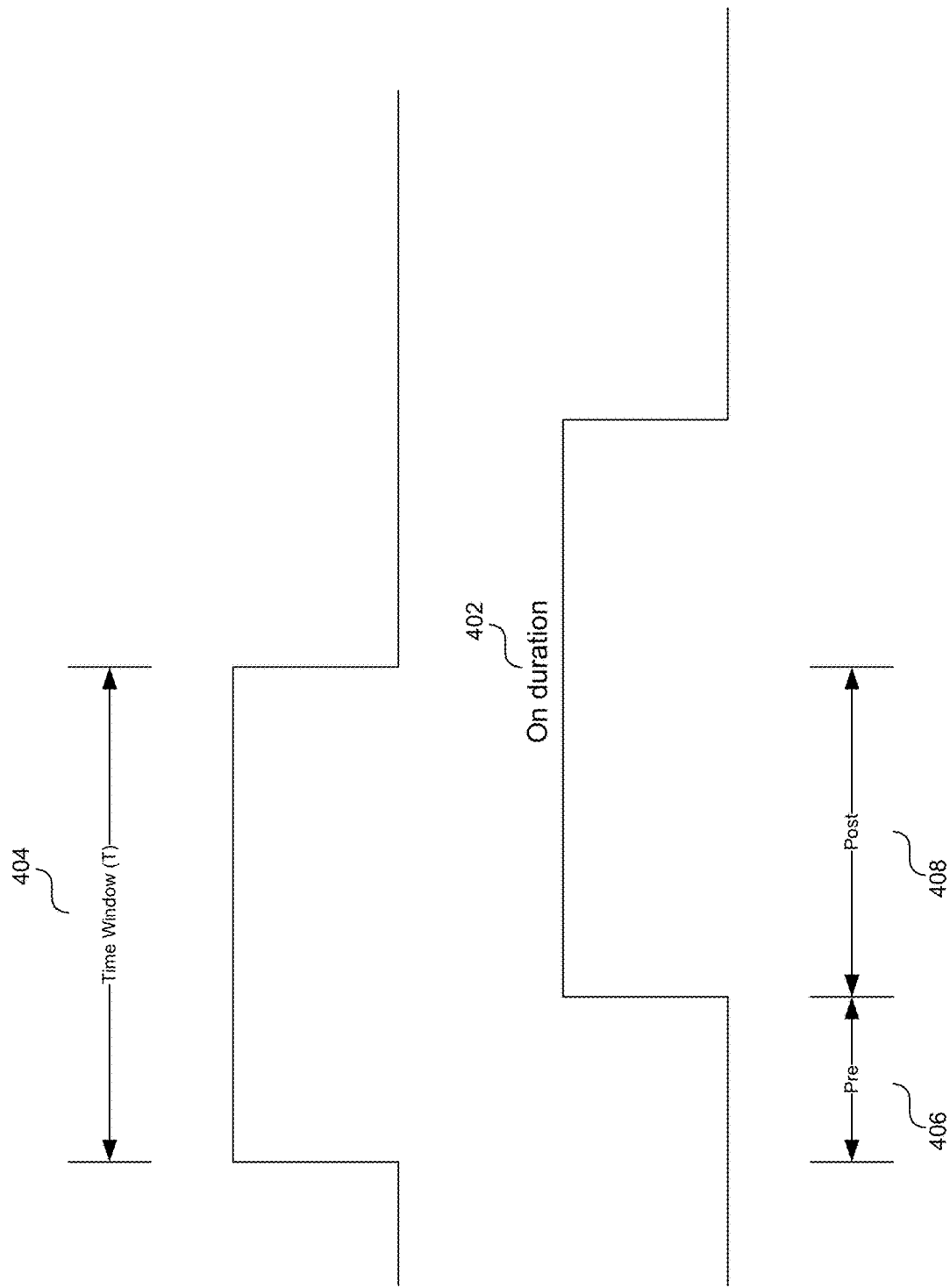

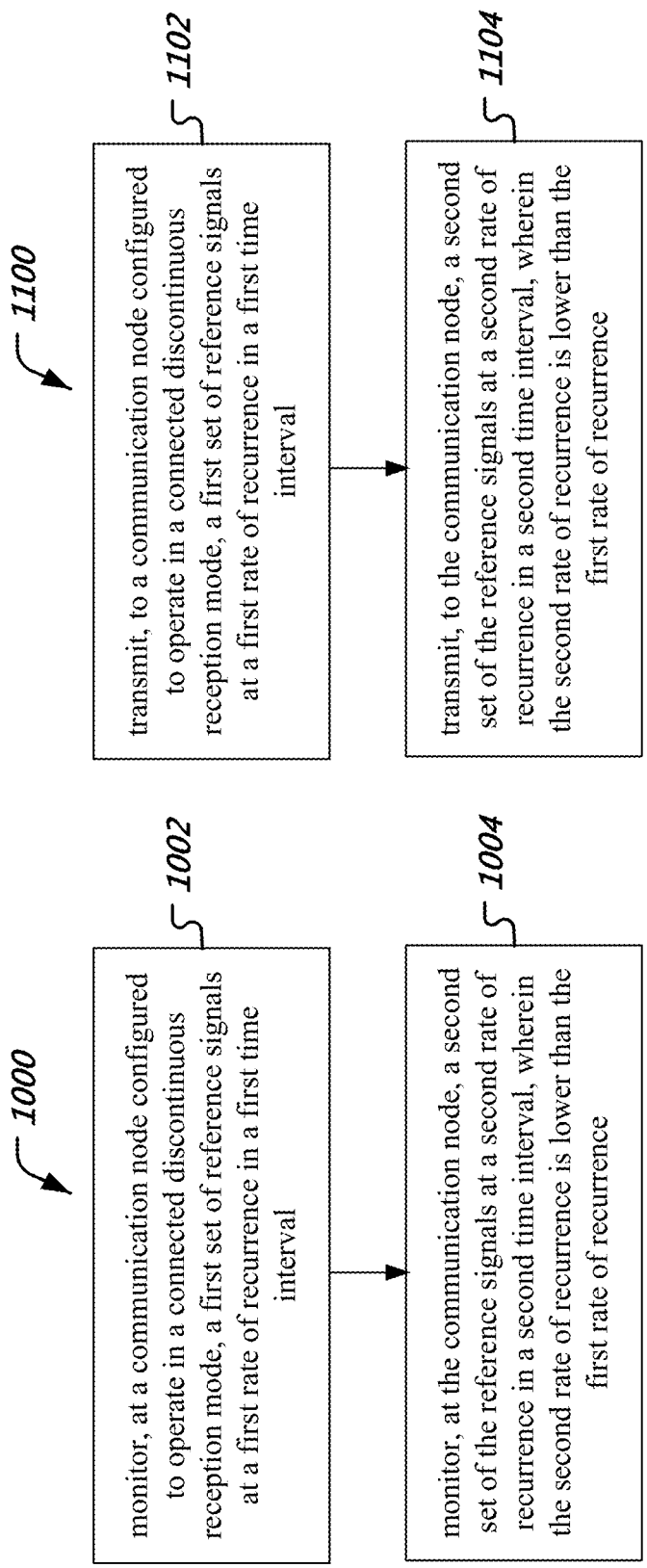

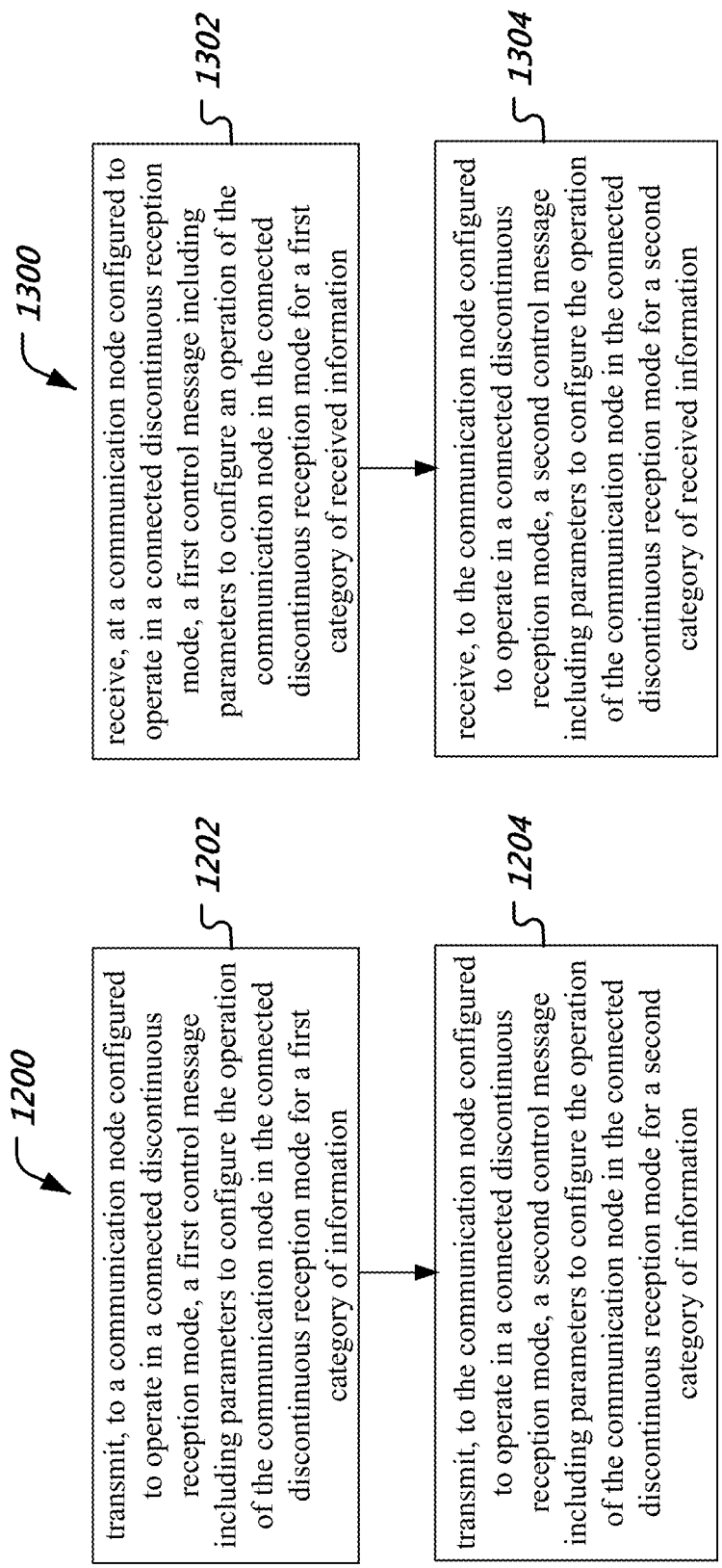

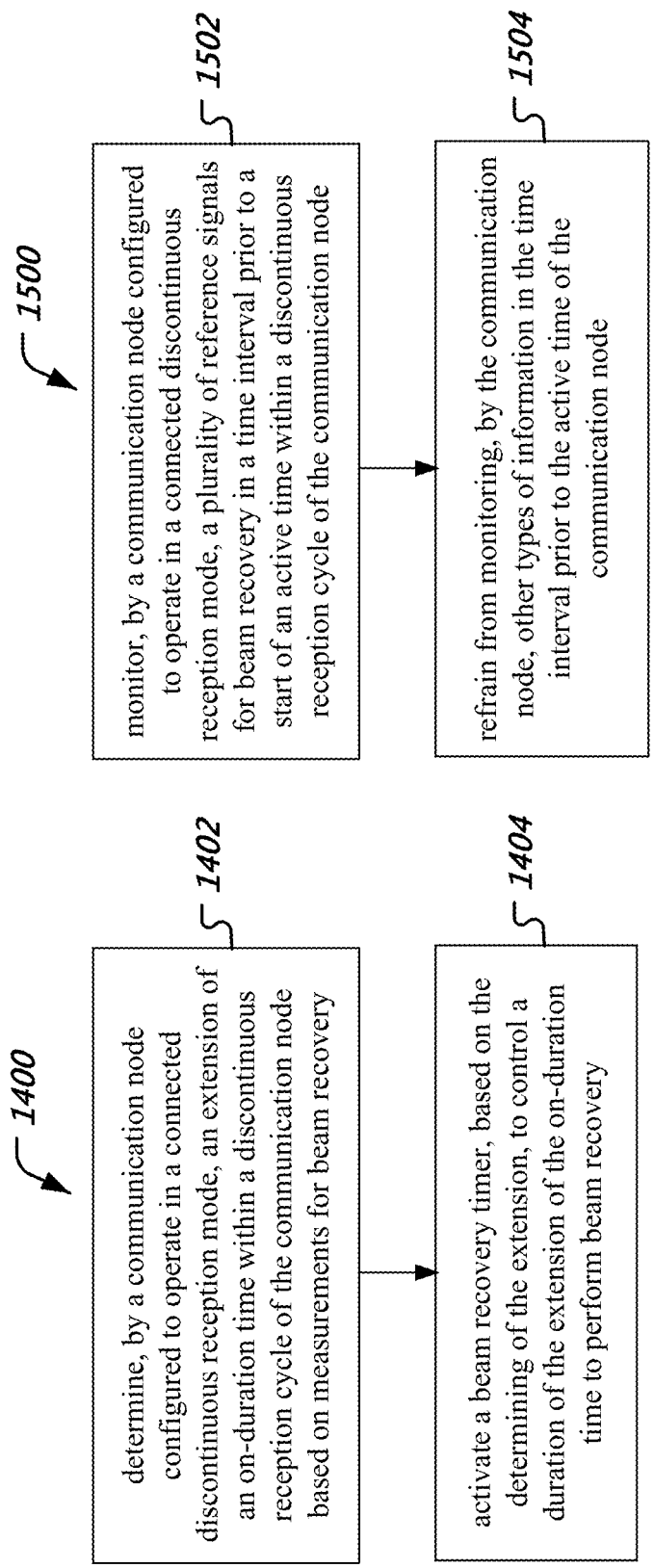

BEAM RECOVERY IN CONNECTED DISCONTINUOUS RECEPTION

CROSS REFERENCE TO RELATED APPLICATIONS

This patent document is a continuation of and claims benefit of priority to International Patent Application No. PCT/CN2017/099974, filed on Aug. 31, 2017. The entire content of the before-mentioned patent application is incorporated by reference as part of the disclosure of this application.

TECHNICAL FIELD

This document is directed generally to digital wireless communications.

BACKGROUND

Mobile communication technologies are moving the world toward an increasingly connected and networked society. The rapid growth of mobile communications and advances in technology has led to greater demand for capacity and peak data rates. Other aspects, such as energy consumption, device cost, spectral efficiency, cost per delivered bit, throughput, and latency are also important to meeting the needs of various applications based on mobile communications. In comparison with the existing wireless networks, next generation systems and wireless communication techniques may need to support a much wider range of use-case characteristics and provide a much more complex range of access requirements and flexibilities.

SUMMARY

This document relates to methods, systems, and devices for beam recovery at mobile stations (UE's) that support connected discontinuous reception (C-DRX).

In one exemplary aspect, a method for wireless communication is disclosed. The method includes monitoring, at a communication node configured to operate in a connected discontinuous reception mode, a first plurality of reference signals in a time window that overlaps at least partially with a semi-active time or an active time within a discontinuous reception cycle of the communication node.

In some embodiments, the method further includes detecting a beam failure event based on the first plurality of reference signals, wherein the beam failure event is triggered when a channel quality falls below a predetermined threshold. In some implementations, the method also includes, after detecting the beam failure event, identifying, based on a second plurality of reference signals, one or more candidate beams for re-establishing a beam pair link for the associate control channel; and transmitting a request for beam recovery, wherein the request includes information of the one or more candidate beams for beam recovery. The request may further include information of the communication node.

In some embodiments, a start time of the time window is located prior to the active time within the discontinuous reception cycle of the communication node. For example, the start time of the time window is determined based on a length of the semi-active time within the discontinuous reception cycle of the communication node.

In some embodiments, a start time of the time window is same as a start time of the active time within the discontinuous reception cycle of the communication node. In some embodiments, a length of the time window is less than half of a length of the active time within the discontinuous reception cycle of the communication node.

In another exemplary aspect, a method for wireless communication is disclosed. The method includes transmitting a plurality of references signals in a time widow that overlaps at least partially with a semi-active time or an active time within a discontinuous reception cycle of a communication node, the communication node configured to operate in a connected discontinuous reception mode.

In some embodiments, the method further includes receiving, from the communication node, a request for beam recovery, wherein the request includes information of beam candidates for beam recovery. The request may further include information of the communication node.

In some embodiments, a start time of the time window is located prior to the active time within the discontinuous reception cycle of the communication node. For example, the start time of the time window is determined based on a length of the semi-active time within the discontinuous reception cycle of the communication node.

In some embodiments, a start time of the time window is same as a start time of the active time within the discontinuous reception cycle of the communication node. In some implementations, a length of the time window is less than half of a length of the active time within the discontinuous reception cycle of the communication node.

In another exemplary aspect, a method for wireless communication is disclosed. The method includes, monitoring, at a communication node configured to operate in a connected discontinuous reception mode, a first set of reference signals at a first rate of recurrence in a first time interval; and monitoring, at the communication node, a second set of the reference signals at a second rate of recurrence in a second time interval, wherein the second rate of recurrence is lower than the first rate of recurrence.

In some embodiments, a beginning of the first time interval is located at a first distance from a beginning of the active time of the communication node, and a beginning of the second time interval is located at a second distance from the beginning of the active time of the communication node, the first distance being shorter than the second distance.

In some embodiments, the first time interval or the second time interval is in a time window that at least partially overlaps with a semi-active time or an active time within a discontinuous reception cycle of the communication node. For example, a start time of the time window may be located prior to the active time within the discontinuous reception cycle of the communication node. In some implementations, a start time of the time window is same as a start time of the active time within the discontinuous reception cycle of the communication node.

In another exemplary aspect, a method for wireless communication is disclosed. The method includes transmitting, to a communication node configured to operate in a connected discontinuous reception mode, a first set of reference signals at a first rate of recurrence in a first time interval; transmitting, to the communication node, a second set of the reference signals at a second rate of recurrence in a second time interval, wherein the second rate of recurrence is lower than the first rate of recurrence.

In some embodiments, a beginning of the first time interval is located at a first distance from a beginning of the active time of the communication node, and a beginning of the second time interval is located at a second distance from the beginning of the active time of the communication node, the first distance being shorter than the second distance.

In some embodiments, the first time interval or the second time interval is in a time window that at least partially overlaps with a semi-active time or an active time within a discontinuous reception cycle of the communication node. For example, a start time of the time window may be located prior to the active time within the discontinuous reception cycle of the communication node. In some implementations, a start time of the time window is same as a start time of the active time within the discontinuous reception cycle of the communication node.

In another exemplary aspect, a method for wireless communication is disclosed. The method includes transmitting, to a communication node configured to operate in a connected discontinuous reception mode, a first control message including parameters to configure the operation of the communication node in the connected discontinuous reception mode for a first category of information; and transmitting, to the communication node configured to operate in a connected discontinuous reception mode, a second control message including parameters to configure the operation of the communication node in the connected discontinuous reception mode for a second category of information.

In another exemplary aspect, a method for wireless communication is disclosed. The method includes receiving, at a communication node configured to operate in a connected discontinuous reception mode, a first control message including parameters to configure an operation of the communication node in the connected discontinuous reception mode for a first category of received information; and receiving, to the communication node configured to operate in a connected discontinuous reception mode, a second control message including parameters to configure the operation of the communication node in the connected discontinuous reception mode for a second category of received information.

In another exemplary aspect, a method for wireless communication is disclosed. The method includes determining, by a communication node configured to operate in a connected discontinuous reception mode, an extension of an on-duration time within a discontinuous reception cycle of the communication node based on measurements for beam recovery; and activating a beam recovery timer, based on the determining of the extension, to control a duration of the extension of the on-duration time to perform beam recovery.

In another exemplary aspect, a method for wireless communication is disclosed. The method includes monitoring, by a communication node configured to operate in a connected discontinuous reception mode, a plurality of reference signals for beam recovery in a time interval prior to a start of an active time within a discontinuous reception cycle of the communication node; and refraining from monitoring, by the communication node, other types of information in the time interval prior to the active time of the communication node. In some embodiments, the other types of information includes information transmitted over control channels.

In another exemplary embodiment, an apparatus that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

BRIEF DESCRIPTION OF THE DRAWINGS

FIG. 4A shows an exemplary timing diagram with a variable and configurable time window.

FIG. 10 is a flowchart representation of another method of wireless communication.

FIG. 11 is a flowchart representation of another method of wireless communication.

FIG. 12 is a flowchart representation of another method of wireless communication.

FIG. 13 is a flowchart representation of another method of wireless communication.

FIG. 14 is a flowchart representation of another method of wireless communication.

FIG. 15 is a flowchart representation of yet another method of wireless communication.

DETAILED DESCRIPTION

Figure 1A:
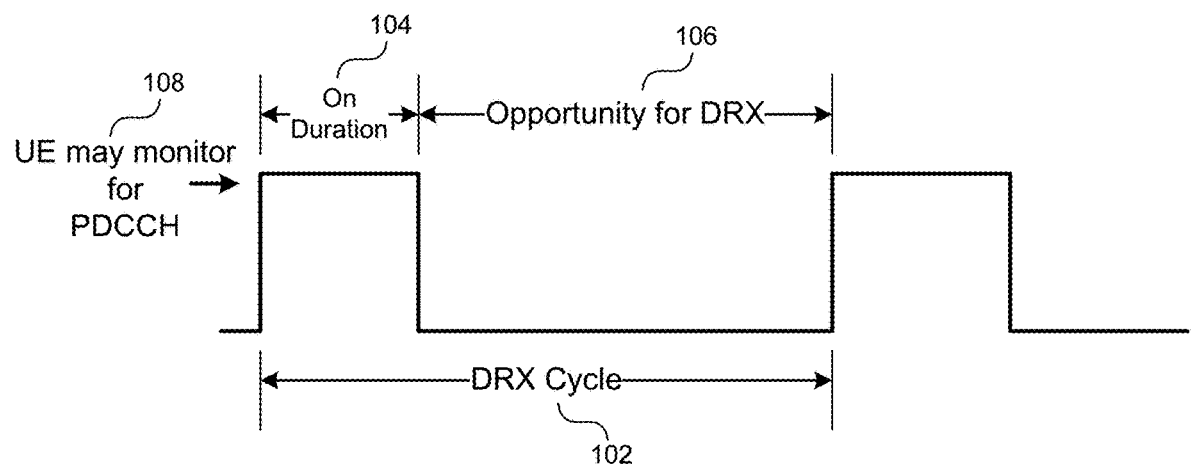
FIG. 1A shows an exemplary timing diagram of a mobile station configured in connected discontinuous reception (C-DRX) mode of operation.

The technology and examples of implementations in this document can be used to improve beam recovery in systems utilizing connected discontinuous reception. The term "exemplary" is used to mean "an example of" and, unless otherwise stated, does not imply an ideal or preferred embodiment. Section headings are used to facilitate understanding and do not limit scope of the described techniques to the corresponding sections.

Power consumption has been a concern since the advent of smart phones. Battery consumption by a cellular modem, for example, may be significant and can impact user experience of the device. Discontinuous reception (DRX) mode is a power-saving technique that has a wide range of applications in the wireless communication system. The DRX mode achieves energy-saving mainly through a dormant period of a mobile station in which the mobile station is able to turn off power to its receiving circuitry. In some existing 4th Generation Wireless systems, mobile stations (UE's) may support DRX to improve battery life.

In some embodiments, a mobile station may operate in a connected mode. In the connected mode, through a Layer-3 (or above) communication, e.g., the radio resource control (RRC) mechanism of LTE, which is known as RRC CONNECTED, mobile stations may be configured by the network to have periodic cycles including an active time in which the mobile station is actively receiving/transmitting, followed by a period of time in which the mobile station is potentially dormant and its receiver(s) may be shut down, enabling power savings. This is also known as connected discontinuous reception (C-DRX) mode of operation.

Additionally in some existing 4th Generation Wireless systems, a base station with multiple antennas may transmit using beamforming technology. Beamforming technology may allow the use of narrow beams directed to intended receiving UEs to improve the transmission efficiency of the wireless network. The use of beamforming technology and support for multiple narrow beams may further enable virtual Multiple Input Multiple Output (MIMO) links to improve transmission efficiency and potentially offer rich new services to mobile users.

Given the dynamic nature of wireless channels, the usage of narrow beams is more sensitive to mobile station movement and beam blocking. In some implementations, use of a higher carrier frequency may increase sensitivity of the beams and increase the occurrences of beam failure. For example, in some embodiments, beam failure may occur because the UE moves partially or completely out of the coverage area of a beam that is directed to the UE based on the UE's previously known position. To improve user experience, the system should support beam recovery to quickly recover from a beam failure.

Because beam failures cannot be predicted or known in advance, beam recovery can be difficult for wireless communication systems that support both discontinuous reception and beamforming. For example, a UE operating in the DRX mode might change its location significantly enough during the time the UE's receiving circuit is off, such that when the UE comes out of the DRX mode into active mode, the beam direction of transmission from the base station may be incorrect. The technology described herein can be used by some embodiments to help alleviate the problems related to beam recovery in C-DRX systems to improve efficiency, throughput, user experience, and/or peak data rates to mobile stations in future wireless networks.

In this patent document, the specifics in the described examples should not be construed as limitation on the scope of the disclosed technology or what may be claimed, but rather as descriptions of features that may or may not be specific to particular embodiments of specific disclosed technology. Certain features that are described in this document are in the context of separate embodiments may also be implemented in combination in a single embodiment. Conversely, features that are described in the context of a single embodiment may also be implemented in multiple embodiments separately or in any suitable combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

Example Embodiments of C-DRX

FIG. 1A shows an exemplary timing diagram of a mobile station configured in the\connected discontinuous reception (C-DRX) mode of operation. The network may configure the discontinuous reception (DRX) cycle 102 via overhead messages through the RRC protocol. The DRX cycle 102 includes an "on-duration" window 104 and an "opportunity for DRX" window 106. At the beginning of the "on-duration" window 104, the mobile station (UE) may start monitoring the channel for possible channel reception 108 (e.g., PDCCH of LTE). At the conclusion of the "on-duration window" 104, the "opportunity for DRX" window 106 begins and the mobile station may power down and turn off circuitry and components no longer used if active reception is not performed. The DRX cycle generally repeats provided the mobile station does not successfully decode channel information informing the mobile station of possible transmission from the base station to the mobile station (DL) or possible transmission from the mobile station to the base station (UL). In some implementations, the DRX cycle 102 duration is preconfigured or signaled via overhead messaging. For example, three modes of operation can be configured: sleep, semi-active, and active. In the "sleep" mode, the UE turns off unnecessary processes and timers to stop transmitting or receiving data. In the "semi-active" mode, the UE may perform measurements based on reference signals and selectively perform receptions of channel control information. In the "active" mode the UE performs transmissions and/or receptions of data as well as other types of information such as channel control information.

Figure 1B:
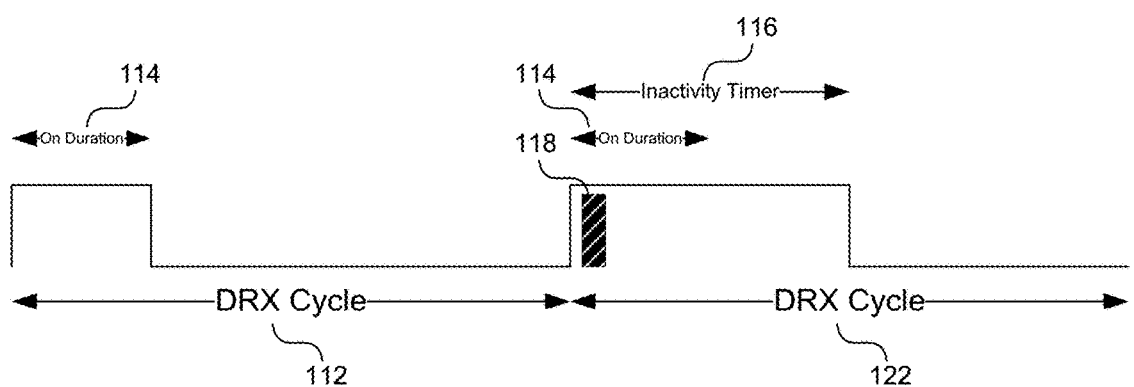
FIG. 1B shows another exemplary timing diagram of a mobile station configured in connected discontinuous reception (C-DRX) mode of operation.

FIG. 1B shows another exemplary timing diagram of a mobile station configured in C-DRX mode of operation. In this example, the mobile station successfully decodes the channel information (e.g., PDCCH) 118 during the "on-duration" window 114 within the second DRX cycle 122. The successful decoding of the channel information 118 may initiate an inactivity timer 116 which extends the active time of the mobile station until the expiration of the inactivity timer 116. The length and resolution of the inactivity timer 116 may be configurable, pre-configured, or signaled via overhead messaging.

Overview of Beam Recovery

Beam failure occurs when the base station is no longer able to reach the UE with a control channel due to incorrect adjustment of the beams. For example, in some cases, the quality of beam pair link(s) of an associated control channel may fall low (e.g., comparison with a threshold, time-out of an associated timer). In some embodiments, a beam failure event is triggered when a measured channel quality (e.g., Pre-coding Matrix Indicator, Rank Indicator, and/or Channel Quality Indicator) falls below a predetermined threshold.

The UE detects this situation by beam monitoring: e.g., estimating the quality of a signal transmitted over a beam that the base station may use to reach the UE. The quality estimation may be based on reception of a certain reference signal that is transmitted to the UE. For example, the reference signal may be transmitted to the UE at regular intervals to provide a good estimate of the channel performance. The base station may instruct the UE to monitor reference signals that are related to the control channel(s) (e.g., having a quasi-co-location relationship with the control channels). Alternatively or in addition, the base station may also simply instruct the UE to monitor a predetermined set of reference signals. Mechanism to recover from beam failure—beam recovery—is triggered when beam failure occurs or is detected.

Figure 2:
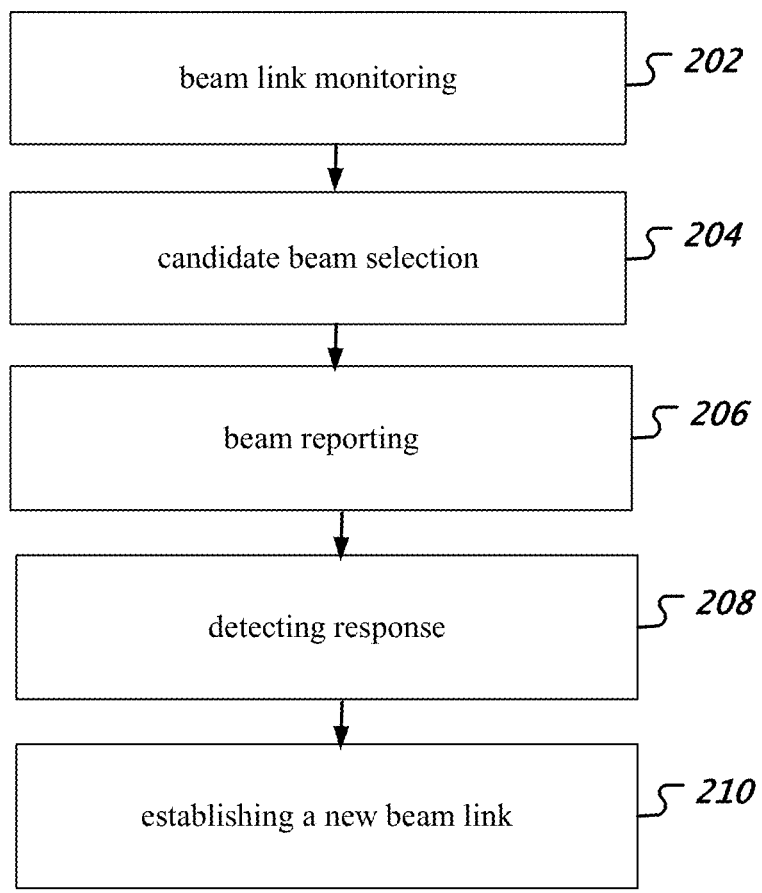
FIG. 2 is a flowchart representation of some exemplary aspects of beam failure recovery.

FIG. 2 shows a flowchart representation of some exemplary aspects of beam failure recovery. First, a UE performs beam monitoring (202) to detect beam failure event(s). After detecting a beam failure event, the UE selects one or more candidate beams (204) using methods such as beamforming or beam sweeping. In some embodiments, the beams are indicated using reference signals, e.g., Channel Station Information Reference Signals (CSI-RSs). The UE then performs beam reporting (206) (e.g., transmitting a beam failure recovery request) and detects a response from the base station (208). After receiving the response from the base station (e.g., a DCI message from the base station), the UE decodes the response to establish a new beam link (210). In some embodiments, the UE may choose to skip beam monitoring and perform candidate beam selection directly.

Technical Challenges

The parameters of DRX are usually preconfigured. For example, the parameters to configure the On_Duration_Timer contain the starting position and length of the "on-duration" window. If there is a triggering event (e.g., a data transfer), the drx-Inactivity-Timer can further extend the active time.

It is, however, difficult to predict when beam monitoring, candidate beam selection, and beam reporting can occur. While beam monitoring may be performed periodically or in a sliding window, candidate beam selection and beam reporting depend on whether beam failure events are detected. Therefore, one or more steps of beam failure recovery can fall outside of the active time of an UE, causing issues for the recovery.

Figure 3A:
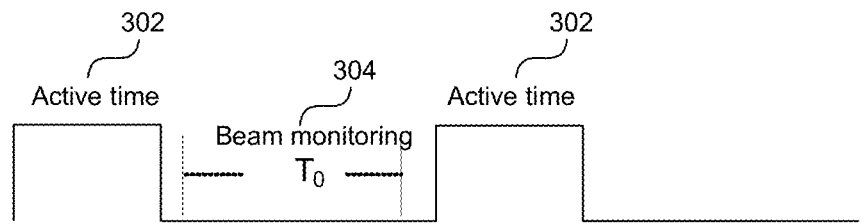
FIG. 3A shows an exemplary timing diagram of a beam monitoring window falling outside of an active time of the mobile station.

FIG. 3A shows an exemplary timing diagram of a beam monitoring window 304 falling entirely or partly outside an active time 302 of the mobile station. Under this condition, the mobile station may not be able to properly monitor beam quality and may result in beam failure.

Figure 3B:
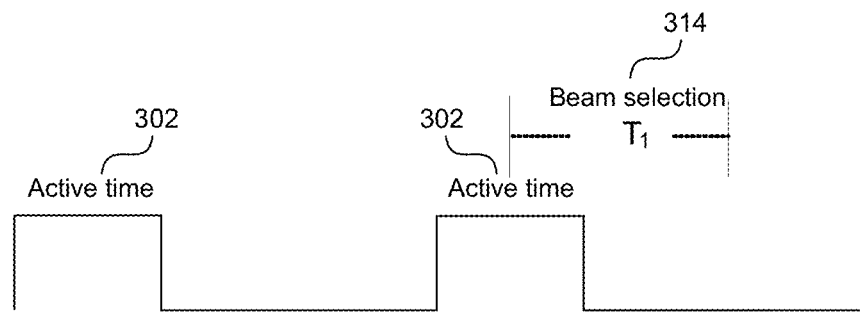
FIG. 3B shows an exemplary timing diagram of a majority of a beam selection window falling outside if an active time of the mobile station.

FIG. 3B shows an exemplary timing diagram of a candidate beam selection window 314 falling entirely or partly outside an active time 302 of the mobile station. Under this condition, the mobile station may not be able to properly select the correct candidate beam(s) and may result in beam failure.

Figure 3C:
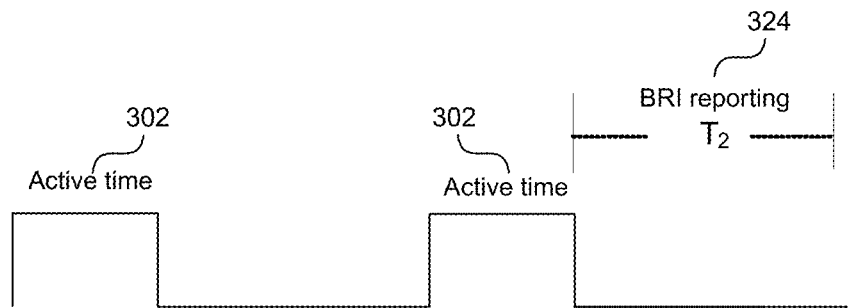
FIG. 3C shows an exemplary timing diagram of a beam reporting window falling outside of an active time of the mobile station.

FIG. 3C shows an exemplary timing diagram of a beam reporting window 324 (e.g., beam refinement information (BRI) reporting) falling entirely or partly outside an active time 302. Under this condition, the mobile station may not be able to properly report the beam failure (e.g., beam state information (BSI) reporting), which may result in beam failure.

Figure 3D:
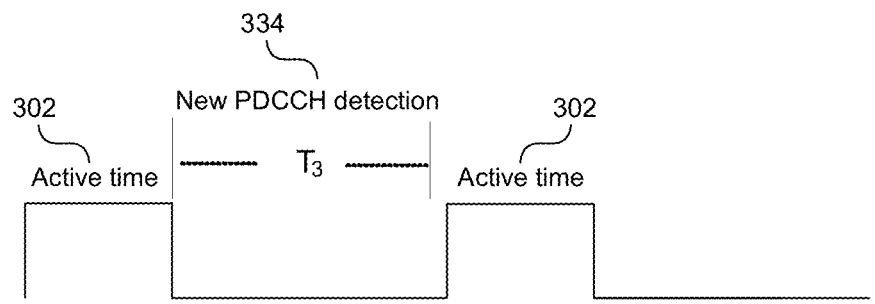
FIG. 3D shows an exemplary timing diagram of a response detection window falling outside of an active time of the mobile station.

FIG. 3D shows an exemplary timing diagram of a response detection window 334 (e.g., PDCCH detection) falling entirely or partly outside an active time 302 of the mobile station. Under this condition, the mobile station may not be able to properly detect response(s) from the base station and may result in beam failure.

Exemplary Embodiments

The following embodiments with various levels of details are set forth to illustrate aspects of the presently disclosed technology that can be used to alleviate the problems related to beam recovery in C-DRX systems. The disclosed techniques can improve efficiency, throughput, user experience, and/or peak data rates to the mobile station in future wireless networks.

Examples of Time Window

FIG. 4A shows an exemplary timing diagram with a variable and configurable time window 404. The time window 404 overlaps with at least partially with the "on-duration" window 402 of the UE. In some embodiments, the time window 404 starts at the same time as the "on-duration" window and ends prior to the end of the "on-duration" window. In some implementations, such as shown in FIG. 4A, the time window starts prior to the beginning of the "on-duration" window, e.g., when the UE starts to wake up from its dormant state and enters a semi-active period, and ends before the "on-duration" window ends.

The UE can expect a plurality of reference signals in the time window. In some embodiments, the plurality of reference signals is transmitted and/or monitored for the purpose of beam monitoring. The UE performs beam monitoring based on the measurements of the plurality of reference signals to determine whether any beam failure event has occurred. Once the UE detects a beam failure event, it identifies one or more candidate beams for re-establishing a beam pair link based on a second set of reference signals. It then transmits a request for beam recovery. The request can include information of the one or more candidate beams that it has just identified.

In some embodiments, the UE may monitor, within its active time, information on the control channels (e.g., PDCCH), monitor reference signals for beam monitoring, and perform data transmission and channel measurements. In some implementations, when the time window starts in a semi-active period of the mobile station, prior to the start of the "on-duration" window, the mobile station monitors reference signals for beam monitoring purpose and may choose to refrain from monitoring other types of information, such as channel control information.

In some embodiments, the plurality of reference signals are transmitted for the purpose of candidate beam selection. The UE performs beamforming and/or beam sweeping (including beam transmissions and receptions) based on the received reference signals to identify one or more candidate beams to be used to re-establish the beam link. If the identified candidate beams are the same as the previous beams used, the UE attempts to use the same beams without reporting to the base station. However, if different beams are identified by the UE, it reports the newly identified beams by transmitting a request for beam recovery to the base station. The request can include information of the one or more candidate beams that it has just identified.

Figure 4B:
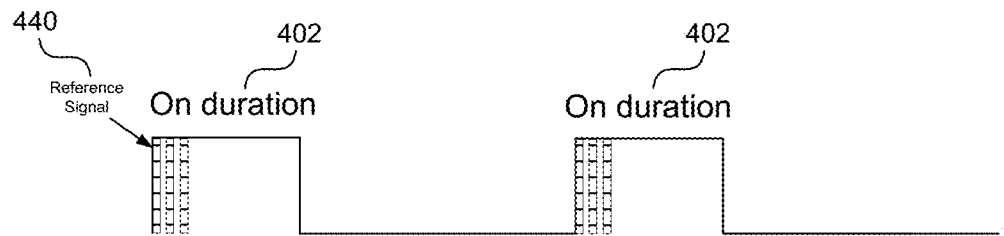
FIG. 4B shows an exemplary timing diagram of reference signals monitored at the beginning of the "on-duration" window.
Figure 4C:
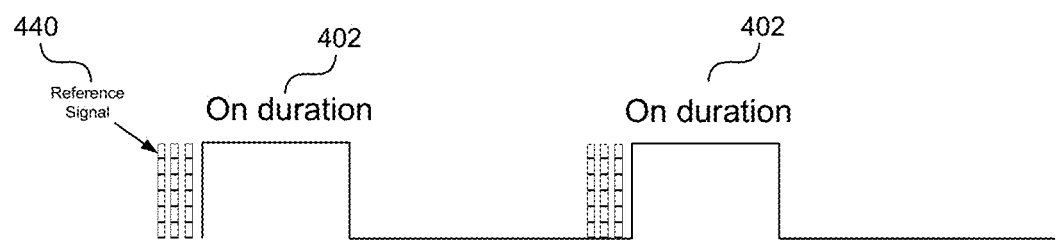
FIG. 4C shows an exemplary timing diagram of reference signals monitored prior to the receiver "on-duration" window.
Figure 4D:
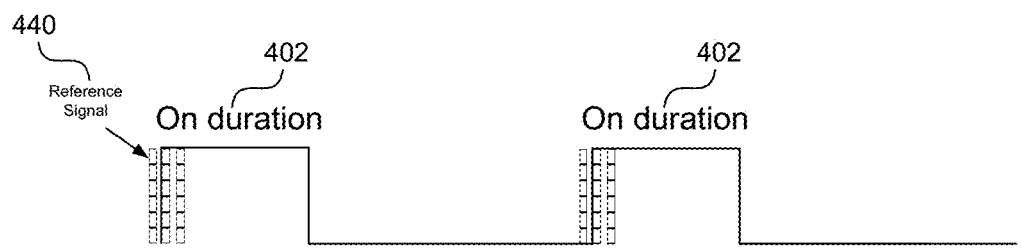
FIG. 4D shows an exemplary receive timing diagram of reference signals monitored prior to and during the "on-duration" window.

FIG. 4B shows an exemplary timing diagram of reference signals 440 monitored at the time the "on-duration" window 402 starts. FIG. 4C shows an exemplary timing diagram of reference signals 440 monitored prior to the "on-duration" window 402 of the UE. FIG. 4D shows an exemplary timing diagram of reference signals 440 monitored prior to and during the "on-duration" window 402. In each of FIGS. 4B, 4C, and 4D, the reference signals are within the time window 404 of FIG. 4A and may be used for different purposes (e.g., beam monitoring, candidate beam selection) as described above.

In some implementations, the time window 404 starts m1 time units prior to the beginning of "on-duration" window, wherein m1≥0 and m1 can be further determined based on the duration of the semi-active time of the UE. The time window ends at m2 time units prior to the beginning of the next "on-duration" window. The parameters m1 and m2, and the corresponding duration T of the time window 404, may be known, pre-configured, or signaled via overhead messaging. The duration T is less than the duration of the "on-duration" window or the active time of the mobile station. For example, T may be less than ½ of the length of the "on-duration" window. In other implementations, T may be less than ¼ of the length of the "on-duration" window. T may also be pre-configured to be ≤40 ms (e.g., 20 ms, 10 ms, etc.). A shorter duration of the time window allows the mobile station to perform actions other than beam monitoring or beam selection in the remaining section of the "on-duration" window or active time.

In some embodiments, in a time window 404 that includes N time units (e.g., N symbols, N slots, etc.), X number of reference signals are transmitted and/or monitored: 1≤X≤N. The ratio between X and N, X/N, is based on the length of the "on-duration" window. In general, a shorter "on-duration" window indicates a shorter time window, which leads to less time to transmit and/or monitor reference signals. In those cases, X/N may be bigger to ensure a good number of reference signals being transmitted and/or monitored for a good estimation of the channel performance. On the other hand, if the "on-duration" window is long, the same number of reference signals can be transmitted and/monitored in a longer time window, leading to a smaller X/N ratio. In some embodiments, X/N can be limited to X/N≥0.125.

Different Rates for Monitoring and Detection

Figure 5A:
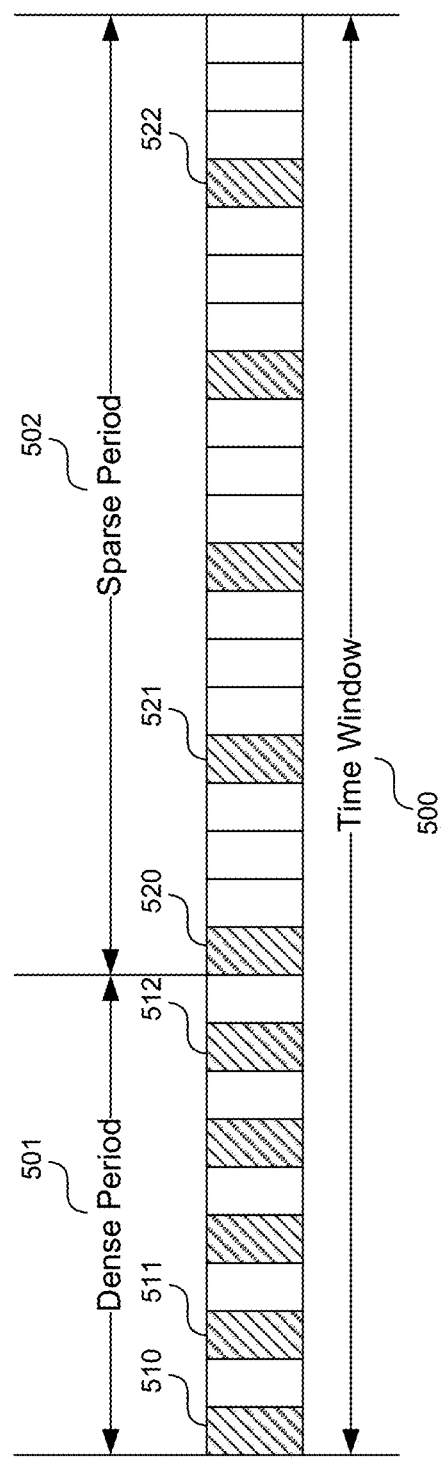
FIG. 5A shows an exemplary timing diagram of a time window.

In some embodiments, the reference signals may be transmitted and/or monitored at different rates of occurrence in the time window. FIG. 5A shows an exemplary timing diagram of a time window 500. In this example, the time window is sub-divided into two periods, at least one dense period 501 and at least one sparse period 502. In some embodiments, the dense period 501 includes Q time units, while the sparse period 502 includes P time units. Q and P may or may not have the same value. During the dense period window 501, the UE monitors the reference signals 510, 511, . . . , and 512 at a higher rate. During the sparse period window 501, the UE monitors the reference signals 520, 521, . . . , 522 at a lower rate. In some embodiments, during the dense period, the base station may allocate additional transmission resources, for example, increase the rate of transmission of the reference signals.

Figure 5B:
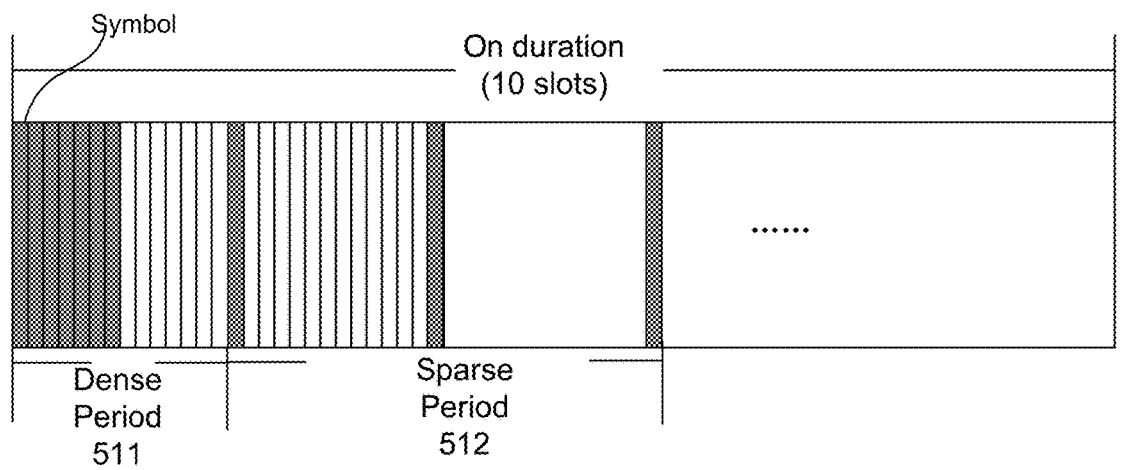
FIG. 5B shows an exemplary time window that starts at the same time as an "on-duration" window.
Figure 5C:
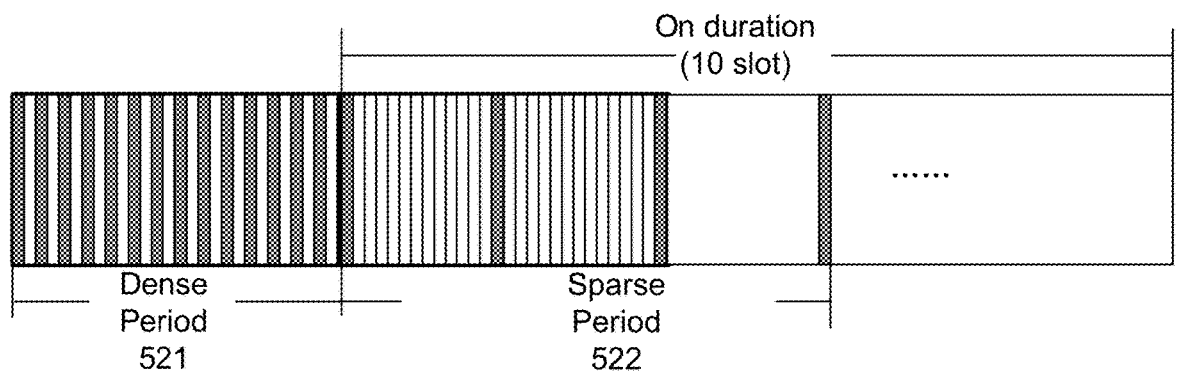
FIG. 5C shows a time window that starts prior to the beginning of the "on-duration" window.
Figure 5D:
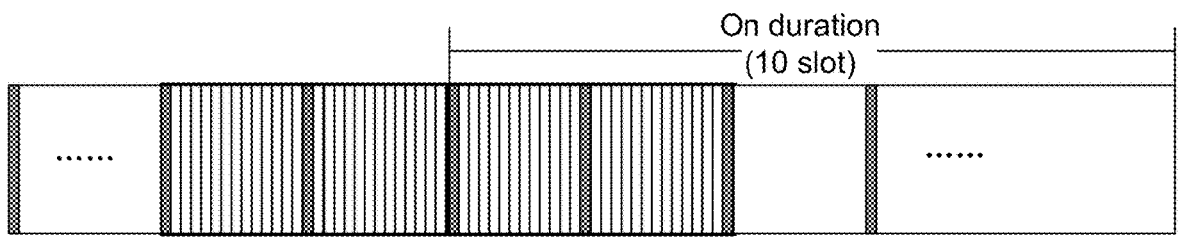
FIG. 5D shows another exemplary time window that starts prior to the beginning of the "on-duration" window.

FIGS. 5B-5D show some examples of reference signals transmitted and/or monitored within the time window. The reference signals shown in these examples can be used for beam monitoring to detect potential beam failures, or for candidate beam(s) identification. FIG. 5B shows an exemplary time window that starts at the same time as an "on-duration" window. The "on-duration" window in this particular example includes 10 slots. Seven reference signals are monitored consecutively within the dense period 511. In the sparse period 512, the reference signals are monitored at a much lower rate. FIG. 5C shows a time window that starts prior to the beginning of the "on-duration" window (e.g., 2 ms prior to the start of "on-duration" window). The "on-duration" window in this particular example includes 10 slots. In this example, because the time window is longer as compared to the time window shown in FIG. 5B, the rate of transmission/monitoring of the reference signals can be lower. For example, reference signals are monitored at every other symbol in the dense period 521. In the sparse period 522, the reference signals are monitored at a much lower rate. FIG. 5D shows another exemplary time window that starts prior to the beginning of the "on-duration" window (e.g., 7 ms prior to the start of the "on-duration" window). The "on-duration" window in this particular example also includes 10 slots. In this case, the time window is long enough that a dense transmission/monitoring of the reference signal is not necessary. Hence, the reference signals are monitored at the same rate within the time window.

The detection of base station responses can also be performed at different rates. For example, the UE performs response detection in another time window that is sub-divided into two periods: a dense period and a sparse period. In some embodiments, the dense period includes R time units, while the sparse period includes S time units. R and S may or may not have the same value. During the dense period window, the UE performs response detection at a higher rate. During the sparse period window, the UE perform response detection at a lower rate. In some embodiments, during the dense period, the base station may increase the rate of transmission of responses.

Examples of C-DRX Configurations based on Information Category

In some embodiments, the channel may be classified into one or more categories representing the various information of different physical and channel characteristics, such as Doppler spread, delay spread, coherence time, coherence bandwidth, mobile speed, and the like, so that the C-DRX parameters may be configured respectively in response to those specific channel characteristics.

For example, the base station configures C-DRX parameters for reference signals used for beam monitoring (i.e., a first category) in a first control message. The base station then configures different C-DRX parameters for other types of information (i.e., a second category) in a second control message. The mobile station, after receiving two separate control messages, configures its DRX-cycles separately according to the information categories.

In another example, the base station configures C-DRX parameters for uplink communication in a first control message. The base station then configures-DRX parameters for downlink communication in a second control message. The mobile station, after receiving two separate control messages, configures its DRX-cycles separately according to the categories (uplink and downlink).

Examples of Beam Recovery Timer

In some embodiments, a beam recovery timer can be added to extend the active time of a UE in response to one or more actions, such as 202, 204, 206, and 208 as shown in FIG. 2, in the beam recovery process. After the beam recovery time activates, the active time is extended until the expiration of the timer. The UE may remain entirely active, or only intermittently active in the extension of its active time. The length and resolution of the beam recovery timer may be configurable, pre-configured, or signaled via overhead messaging.

Figure 6:
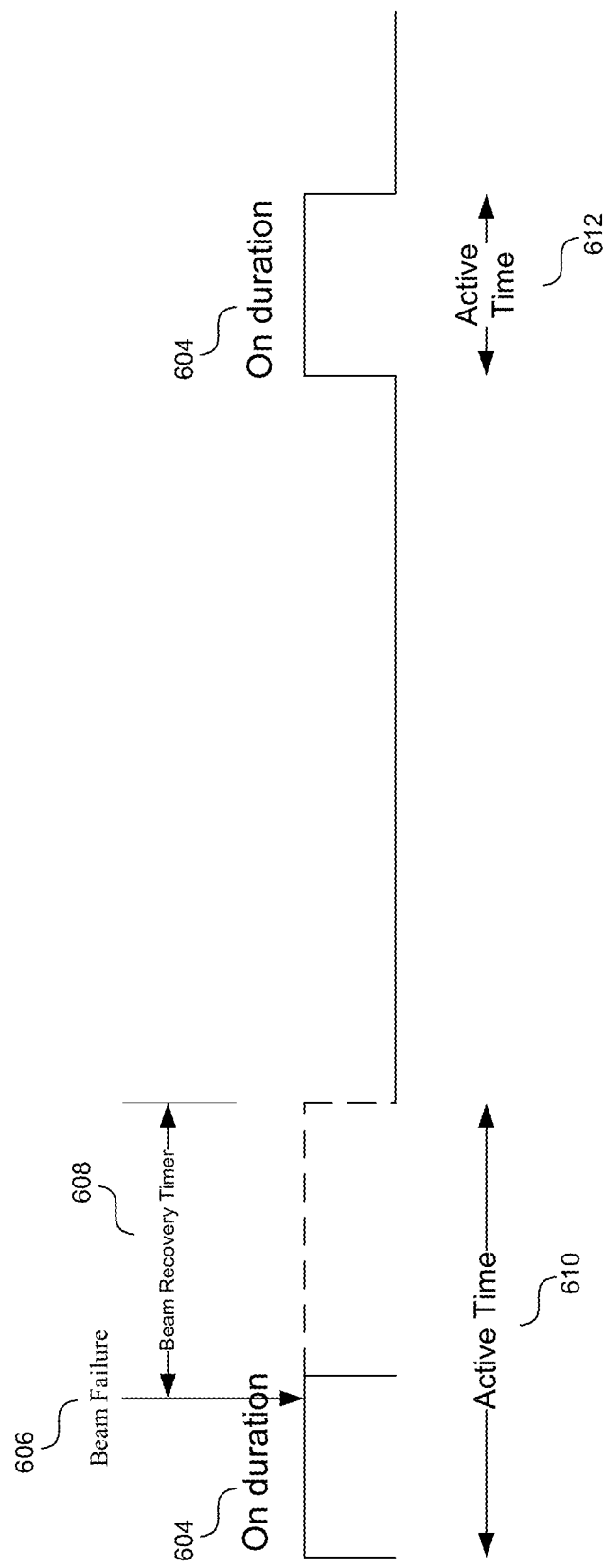
FIG. 6 shows an exemplary timing diagram of a beam recovery timer.

FIG. 6 shows an exemplary timing diagram of a beam recovery timer. In this example, the UE detects a beam failure 606 within the "on-duration" window 604. However, the "on-duration" window 604 may be too short for the UE to complete the operations of beam failure recovery. Thus, the UE may initiate a beam recovery timer 608 that extends the active time 610 of the UE. The active time now is extended until the expiration of the beam recovery timer 608. The UE may remain entirely active, or only intermittently active in the extension of its active time. The length and resolution of the beam recovery timer 608 may be configurable, pre-configured, or signaled via overhead messaging.

In some embodiments, the UE may decide to initiate a beam recovery timer 608 without performing beam monitoring. The UE may decide to perform beam detection directly and initiate the beam recovery timer 608 to ensure that the UE stays active to complete the operations of beam failure recovery. The beam recovery timer 608 extends the active time of the UE until the expiration of the beam recovery timer 608. The UE may remain entirely active, or only intermittently active in the extension of its active time. The length and resolution of the beam recovery timer 608 may be configurable, pre-configured, or signaled via overhead messaging.

Figure 7:
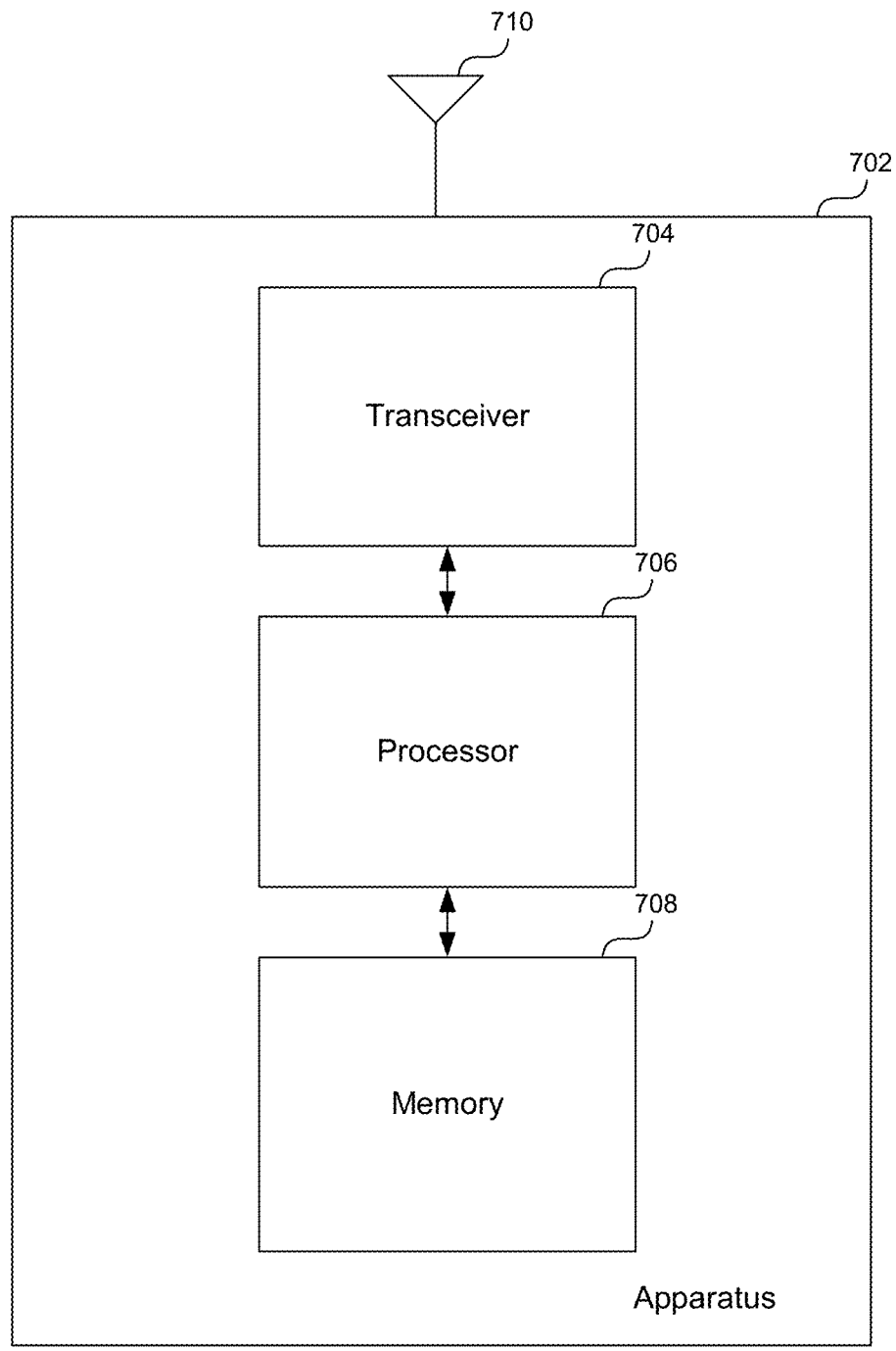
FIG. 7 shows an exemplary apparatus that may implement any of the methods described in the presently disclosed technology.

FIG. 7 shows an example apparatus 702 including a transceiver 704, a processor 706, memory 708, and an antenna 710 that may be used to implement the methods described in the present document.

Figures 8, 9:
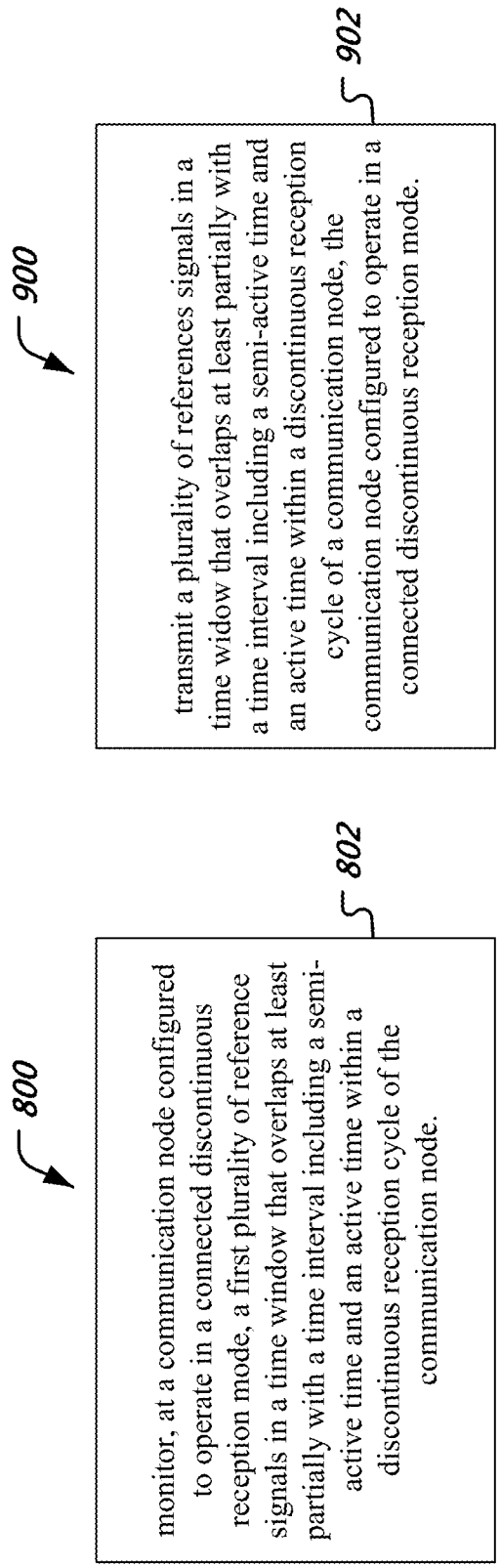
FIG. 8 is a flowchart representation of a method of wireless communication.
FIG. 9 is a flowchart representation of another method of wireless communication.

FIG. 8 is a flowchart representation of a method 800 for wireless communication. The method 800 includes, at 802, monitoring, at a communication node configured to operate in a connected discontinuous reception mode, a first plurality of reference signals in a time window that overlaps at least partially with a semi-active time or an active time within a discontinuous reception cycle of the communication node.

FIG. 9 is a flowchart representation of a method 900 for wireless communication. The method 900 includes, at 902, transmitting a plurality of references signals in a time widow that overlaps at least partially with a semi-active time or an active time within a discontinuous reception cycle of a communication node, the communication node configured to operate in a connected discontinuous reception mode.

FIG. 10 is a flowchart representation of a method 1000 for wireless communication. The method 1000 includes, at 1002, monitoring, at a communication node configured to operate in a connected discontinuous reception mode, a first set of reference signals at a first rate of recurrence in a first time interval; and, at 1004, monitoring, at the communication node, a second set of the reference signals at a second rate of recurrence in a second time interval, wherein the second rate of recurrence is lower than the first rate of recurrence.

FIG. 11 is a flowchart representation of a method 1100 for wireless communication. The method 1100 includes, at 1102, transmitting, to a communication node configured to operate in a connected discontinuous reception mode, a first set of reference signals at a first rate of recurrence in a first time interval; at 1104, transmitting, to the communication node, a second set of the reference signals at a second rate of recurrence in a second time interval, wherein the second rate of recurrence is lower than the first rate of recurrence.

FIG. 12 is a flowchart representation of a method 1200 for wireless communication. The method 1200 includes, at 1202, transmitting, to a communication node configured to operate in a connected discontinuous reception mode, a first control message including parameters to configure the operation of the communication node in the connected discontinuous reception mode for a first category of information; and, at 1204, transmitting, to the communication node configured to operate in a connected discontinuous reception mode, a second control message including parameters to configure the operation of the communication node in the connected discontinuous reception mode for a second category of information.

FIG. 13 is a flowchart representation of a method 1300 for wireless communication. The method 1300 includes, at 1302, receiving, at a communication node configured to operate in a connected discontinuous reception mode, a first control message including parameters to configure an operation of the communication node in the connected discontinuous reception mode for a first category of received information; and, at 1304, receiving, to the communication node configured to operate in a connected discontinuous reception mode, a second control message including parameters to configure the operation of the communication node in the connected discontinuous reception mode for a second category of received information.

FIG. 14 is a flowchart representation of a method 1400 for wireless communication. The method 1400 includes, at 1402, determining, by a communication node configured to operate in a connected discontinuous reception mode, an extension of an on-duration time within a discontinuous reception cycle of the communication node based on measurements for beam recovery; and, at 1404, activating a beam recovery timer, based on the determining of the extension, to control a duration of the extension of the on-duration time to perform beam recovery.

FIG. 15 is a flowchart representation of a method 1500 for wireless communication. The method 1500 includes, at 1502, monitoring, by a communication node configured to operate in a connected discontinuous reception mode, a plurality of reference signals for beam recovery in a time interval prior to a start of an active time within a discontinuous reception cycle of the communication node; and, at 1504, refraining from monitoring, by the communication node, other types of information in the time interval prior to the active time of the communication node.

It will be appreciated that the present document discloses techniques, such as time windows, transmission of reference signals at different rates of occurrences, and a beam recovery timer, that can be used to alleviate the problems related to beam recovery in C-DRX systems. The disclosed techniques facilitate the completion of beam recovery process when a UE is in its active time. It will further be appreciated that the disclosed techniques can improve efficiency, throughput, user experience, and/or peak data rates to the mobile station in future wireless networks.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Only a few implementations and examples are described and other implementations, enhancements and variations can be made based on what is described and illustrated in this disclosure.

What is claimed is:

1. A method for wireless communication comprising:
   monitoring, at a communication node configured to operate in a connected discontinuous reception mode, a first plurality of reference signals in a time window that overlaps at least partially with a semi-active time or an active time within a discontinuous reception cycle of the communication node,
   wherein a start time of the time window is configured to begin m1 time units prior to a beginning of an on-duration window of the discontinuous reception cycle, a value of m1 based on a length of the semi-active time within the discontinuous reception cycle of the communication node;
   detecting a beam failure event based on the first plurality of reference signals, wherein the beam failure event is triggered when a channel quality falls below a predetermined threshold; and
   transmitting a request for beam recovery in response to the beam failure event.

2. The method of claim 1, further comprising, after detecting the beam failure event:
   identifying, based on a second plurality of reference signals, one or more candidate beams for re-establishing a beam pair link for the associate control channel, wherein the request includes information of the one or more candidate beams for beam recovery.

3. The method of claim 1, wherein the start time of the time window is located prior to the active time within the discontinuous reception cycle of the communication node.

4. The method of claim 1, wherein the start time of the time window is same as a start time of the active time within the discontinuous reception cycle of the communication node.

5. The method of claim 1, wherein a length of the time window is less than half of a length of the active time within the discontinuous reception cycle of the communication node.

6. A method for wireless communication, comprising:
   transmitting a plurality of references signals in a time widow that overlaps at least partially with a semi-active time or an active time within a discontinuous reception cycle of a communication node, the communication node configured to operate in a connected discontinuous reception mode,
   wherein a start time of the time window is configured to begin m1 time units prior to a beginning of an on-duration window of the discontinuous reception cycle, a value of m1 based on a length of the semi-active time within the discontinuous reception cycle of the communication node; and
   receiving, from the communication node, a request for beam recovery in response to a beam failure event that is determined in part based on the plurality of reference signals, wherein the request includes information of beam candidates for beam recovery.

7. The method of claim 6, wherein the request further includes information of the communication node.

8. The method of claim 6, wherein the start time of the time window is located prior to the active time within the discontinuous reception cycle of the communication node.

9. The method of claim 6, wherein the start time of the time window is same as a start time of the active time within the discontinuous reception cycle of the communication node.

10. The method of claim 6, wherein a length of the time window is less than half of a length of the active time within the discontinuous reception cycle of the communication node.

11. An apparatus for wireless communication, comprising:
    a processor; and
    a memory including processor-executable instructions stored thereon, the processor-executable instructions upon execution by the processor configures the processor to:
    operate in a connected discontinuous reception mode having a discontinuous reception cycle,
    monitor a first plurality of reference signals in a time window that overlaps at least partially with a semi-active time or an active time within the discontinuous reception cycle,
    wherein a start time of the time window is configured to begin m1 time units prior to a beginning of an on-duration window of the discontinuous reception cycle, a value of m1 based on a length of the semi-active time within the discontinuous reception cycle of the communication node,
    detect a beam failure event based on the first plurality of reference signals, wherein the beam failure event is triggered when a channel quality falls below a predetermined threshold, and
    transmit a request for beam recovery in response to the beam failure event.

12. The apparatus of claim 11, wherein the processor is configured to:
identify, based on a second plurality of reference signals, one or more candidate beams for re-establishing a beam pair link for the associate control channel, wherein the request includes information of the one or more candidate beams for beam recovery.

13. The apparatus of claim 11, wherein the start time of the time window is located prior to the active time within the discontinuous reception cycle.

14. The apparatus of claim 11, wherein the start time of the time window is same as a start time of the active time within the discontinuous reception cycle.

15. The apparatus of claim 11, wherein a length of the time window is less than half of a length of the active time within the discontinuous reception cycle.

16. An apparatus for wireless communication, comprising:
a processor; and
a memory including processor-executable instructions stored thereon, the processor-executable instructions upon execution by the processor configures the processor to:
transmit a plurality of references signals in a time widow that overlaps at least partially with a semi-active time or an active time within a discontinuous reception cycle of a communication node that is configured to operate in a connected discontinuous reception mode,
wherein a start time of the time window is configured to begin m1 time units prior to a beginning of an on-duration window of the discontinuous reception cycle, a value of m1 based on a length of the semi-active time within the discontinuous reception cycle of the communication node, and
receive, from the communication node, a request for beam recovery in response to a beam failure event that is determined in part based on the plurality of reference signals, wherein the request includes information of beam candidates for beam recovery.

17. The apparatus of claim 16, wherein the request further includes information of the communication node.

18. The apparatus of claim 16, wherein the start time of the time window is located prior to the active time within the discontinuous reception cycle of the communication node.

19. The apparatus of claim 16, wherein the start time of the time window is same as a start time of the active time within the discontinuous reception cycle of the communication node.

20. The apparatus of claim 16, wherein a length of the time window is less than half of a length of the active time within the discontinuous reception cycle of the communication node.

* * * * *

UNITED STATES PATENT AND TRADEMARK OFFICE
CERTIFICATE OF CORRECTION

PATENT NO. : 11,297,676 B2
APPLICATION NO. : 16/805734
DATED : April 5, 2022
INVENTOR(S) : Chen et al.

It is certified that error appears in the above-identified patent and that said Letters Patent is hereby corrected as shown below:

In the Drawings

In Figure 9, Sheet 10 of 13, Line 2, delete "widow" and insert -- window --, therefor.

In the Specification

In Column 2, Line 7, delete "widow" and insert -- window --, therefor.

In Column 4, Line 15, delete "if" and insert -- of --, therefor.

In Column 6, Line 2, delete "are", therefor.

In Column 11, Line 44, delete "widow" and insert -- window --, therefor.

In the Claims

In Column 14, Line 12, in Claim 6, delete "widow" and insert -- window --, therefor.

In Column 15, Line 25, in Claim 16, delete "widow" and insert -- window --, therefor.

Signed and Sealed this
Twelfth Day of July, 2022

Katherine Kelly Vidal
*Director of the United States Patent and Trademark Office*